United States Patent [19]

Parsons

[11] 4,329,681

[45] May 11, 1982

[54] TAMPER SENSOR SYSTEM

[76] Inventor: Zane W. Parsons, 2010 Ridgelawn Dr., Kenova, W. Va. 25530

[21] Appl. No.: 188,315

[22] Filed: Sep. 18, 1980

[51] Int. Cl.$^3$ ........................ G08B 13/22; B60R 25/10

[52] U.S. Cl. .................................... 340/568; 340/533; 340/572; 340/652; 340/687

[58] Field of Search .................. 340/63, 64, 506, 568, 340/572, 531, 533, 650, 652, 653, 687

[56] References Cited

U.S. PATENT DOCUMENTS 3,803,577 4/1974 Peterson ............................ 340/568

*Primary Examiner*—Alvin H. Waring

*Attorney, Agent, or Firm*—Dennison, Meserole, Pollack & Scheiner

[57] ABSTRACT

An adjustable tamper sensor system for bolts and screws, which connect a non-conductive base and cover, provides a secure housing. An electrically conductive wire and a resistive element in the cover are coupled to the screws and to a resistive bridge alarm circuit. The resistive element in the sensor cover maintains a balanced circuit, and is shunted by any object with less electrical resistance, causing an alarm to report. If an attempt is made to saw through a bolt securing the cover, the conductive wire will be severed or shorted, activating the alarm. The tamper sensor may actually comprise the housing to form a condition responsive detector.

In a more simple embodiment, the tamper sensor may protectively conceal any bolt or screw attached to any object.

15 Claims, 13 Drawing Figures

FIG. 7
FIG. 8
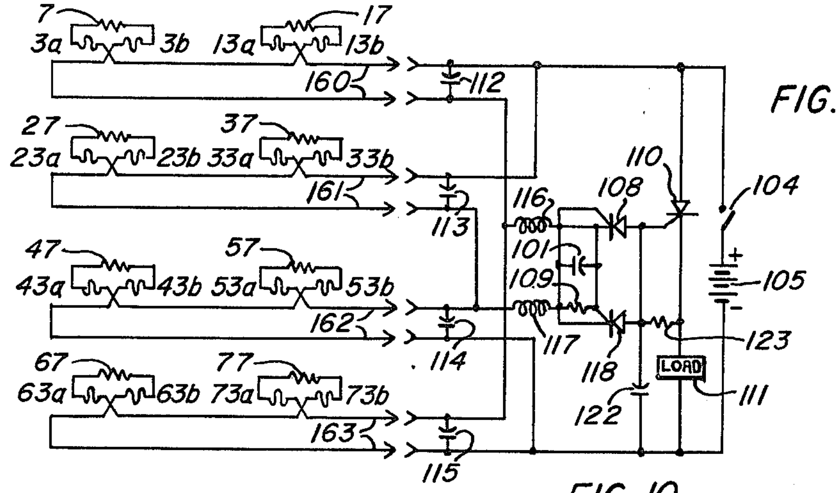
FIG. 10
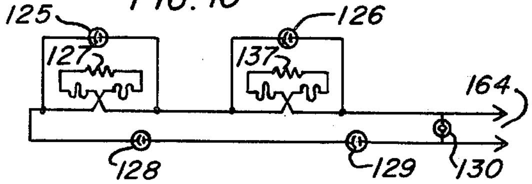
FIG. 9
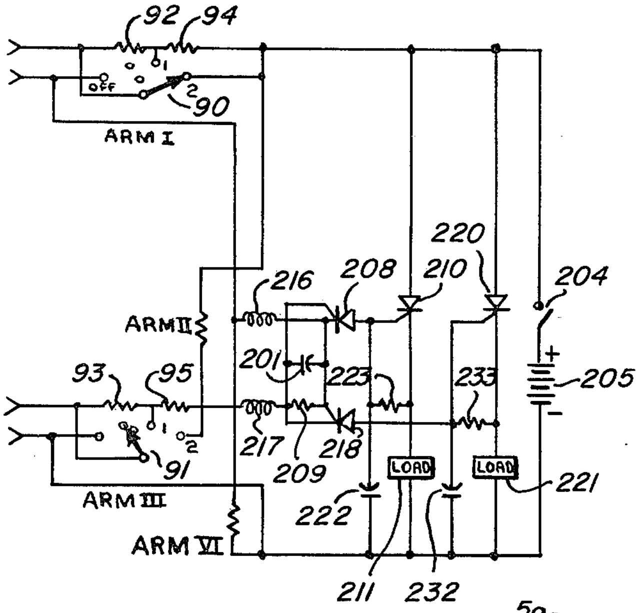
FIG. 11
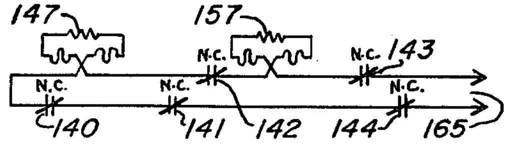
FIG. 12
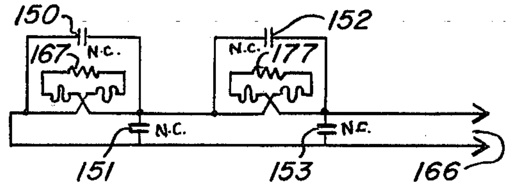
FIG. 13
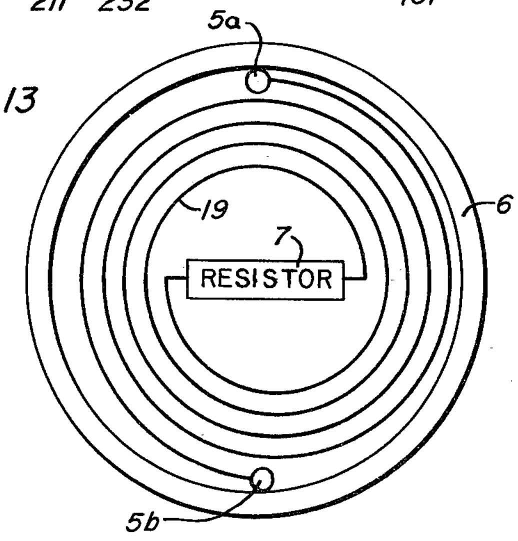

TAMPER SENSOR SYSTEM

BACKGROUND OF THE INVENTION

This invention relates to tamper sensors for bolts and screws, and more particularly to the arrangement of such a sensing device and a circuit for sensing tampering and reporting an alarm.

Generally, in order to maintain the integrity of a housing cover installed on a base, various mechanical arrangements may be used for prevention of tampering and theft. However, there are practical limits to how secure a mechanical housing may be constructed so as to resist tampering. Stronger materials may be chosen for screws, bolts, and other fasteners, or the cover may be made of a material having greater strength. But, in some way, structural integrity may be violated, and this condition needs to be sensed and reported.

There are other situations in which it is desirable to have a housing cover removably attached to a base, as by bolts and screws, to allow authorized removal of the cover. In this situation it is often desirable to prevent tampering with, or the unauthorized removal of, the cover. Up until this time, there have been no satisfactory systems for preventing physical tampering, and there are no electrical tamper sensing systems for sensing tampering and reporting an alarm while tampering is in progress. Further, there are no satisfactory electrical tamper sensors responsive to the simple removal of bolts and screws for actuating an alarm.

The prior U.S. patent literature shows U.S. Pat. Nos. 4,092,641 to Billinghausen et al and 3,866,203 to Berns. The Billinghausen system is responsive to attempts to pilfer or tamper with condition detector structures, such as smoke detectors, intrusion detectors and the like. A switch apparatus incorporated with the enclosure completes a circuit and sounds an alarm. The Berns patent also discloses an audible signaling apparatus having a switch which is subject to actuation by physical movement of a lock housing. Other tamper sensing systems are known from U.S. Pat. Nos. 4,150,371 and 4,149,158.

SUMMARY OF THE INVENTION

The foregoing and other objects of this invention are realized in various illustrative embodiments thereof, which include a sensor cover secured in place with screws or bolts, and a tamper sensing circuit coupled between the screws. The tamper sensing circuit may include an undulating wire conductor, resistive elements, or photoelectric cells in the sensor loops. The sensor loops serve as balanced bridge arms in the alarm and control circuit. Silicon controlled rectifiers are responsive to an imbalance in the circuit and activate a latching load in an energized state.

Accordingly, it is an object of the present invention to provide an improved tamper sensing structure and alarm reporting system for reporting an alarm in response to the unauthorized removal of screws, bolts, and other connectors.

A further object of the present invention is to provide an improved tamper sensing structure for reporting an alarm upon attempting removal of an enclosure from its intended mounting. Another object of the present invention is to provide an improved tamper sensing structure sensitive to any attempt to drill or cut through the sensor cover.

It is also an object of this invention to sense any physical violation of the housing, which may cover a key lock or door handle.

A further object of this invention is to provide a sensing and alarm reporting circuit which is selectively adjustable, and which may be used in conjunction with resistance sensors, closed circuit sensors, and other common sensing devices such as photoelectric cells.

Another object of the present invention is to provide an alarm reporting system which may include resistance sensors, closed circuit sensors, and/or photoelectric detectors in the sensor loops.

These and further objects of the present invention will be more readily understood in view of the subsequent detailed description of the preferred embodiments of the present invention in connection with the drawings.

BRIEF DESCRIPTION OF THE DRAWINGS

FIG. 7 shows a schematic representation of a plurality of tamper sensors connected in a circuit.

FIG. 8 shows a schematic representation of a tamper detecting circuit coupled to a plurality of tamper sensors.

FIG. 9 shows an alternate embodiment of an adjustable tamper sensing detector circuit.

FIG. 10 shows the tamper sensor of the present invention and circuit with photocell detectors.

FIG. 11 is a schematic representation of the tamper sensors in circuit with normally closed intrusion detection contacts.

FIG. 12 shows tamper sensors in circuit with normally open intrusion detection contacts.

FIG. 13 is a top view of a tamper sensor cover, showing a preferred arrangement of the resistor sensor.

DESCRIPTION OF THE PREFERRED EMBODIMENT

Figure 5:
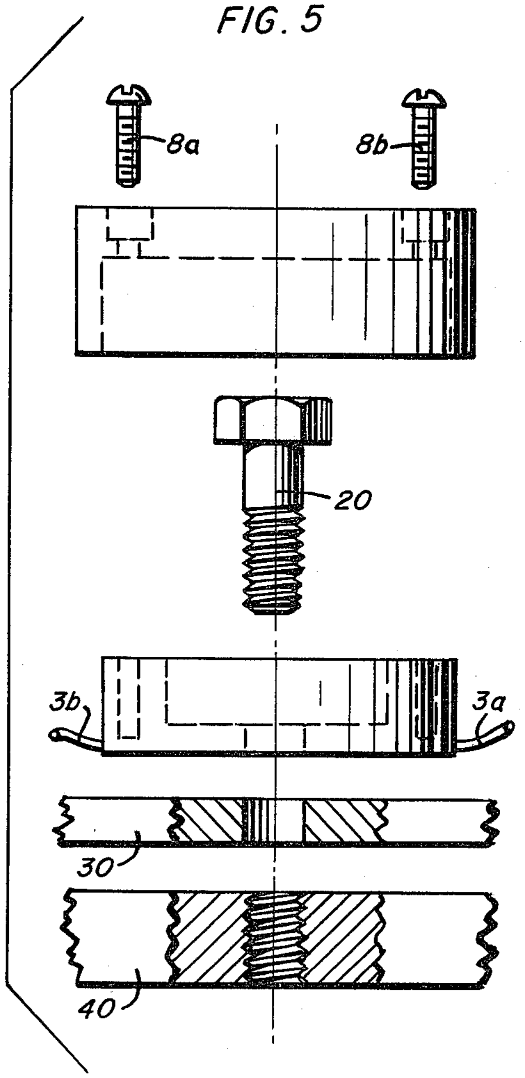
FIG. 5 is an exploded view of the assembly of a sensor cover and base with parts broken away.

Referring now to the drawings in more detail, and first to FIG. 5 thereof, a tamper sensor according to the invention consists of two sections, a top cover 6 and a base 1. These two sections are made of durable material resistant to physical tampering, and are non-conductive. The cover 6 is physically connected to the base 1 by screws **8*a* and 8*b* inserted through countersunk holes 9*a* and 9*b*, respectively, at approximately 180° apart. Screws 8*a* and 8*b* engage collars 10*a* and 10*b*, and are secured in holes 4*a* and 4*b* in base 1, which may be threaded. The cover 6 slides over and enshrouds base 1. The base 1 further accepts screw or bolt 20, which passes through center hole 12. The head of bolt 20 engages the inner surface of the base at 14. Further, the bolt 20 will secure the tamper sensor to a surface 30 or 40 (or both), through holes 31 or 41, which may be threaded. FIG. 5 therefore illustrates the sequence of assembly of the two-section tamper sensor, engaged to conceal a bolt which secures to surfaces 30 or 40**.

Figure 6:
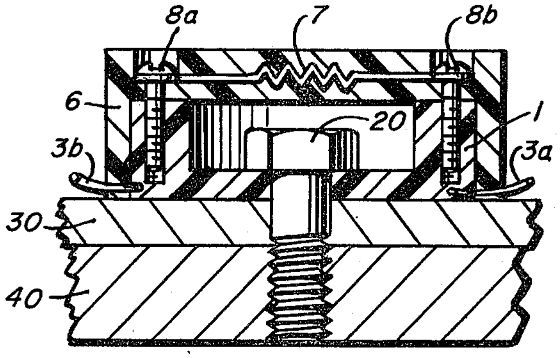
FIG. 6 shows an assembled tamper sensor cover and base unit in cross-section.

FIG. 6 shows the assembled tamper sensor shown in FIG. 5, similar reference numerals indicating similar features.

Before turning to an even more detailed description of the characteristics of the tamper sensor base and cover, it should be noted that the tamper sensor already discussed may have a wide variety of uses which determine its actual configuration. For example, the sensor cover and base may represent any condition detection structures, or enclosure, such as smoke detectors, intrusion detectors, burglar alarms, and the like, which may be bolted or otherwise attached to a surface or object. In such an embodiment of the invention, where a condition detection structure is closed by screws, bolts, or other electrically conductive connectors, the tamper sensor system of the present invention will detect attempts to disassemble, pilfer, or otherwise tamper with the closed structure. This can be seen with reference to FIG. 6 which shows a housing attached to a surface. The housing may be of any size or shape, and may be attached to the surface by any means, even adhesive. For every case, the tamper sensor will electrically detect an attempt to violate the housing or to remove the screws 8*a* or 8*b* to open the housing cover.

In another embodiment of the invention, also with reference to FIG. 6, the tamper sensor may simply protect a screw or bolt 20 which already connects objects or surfaces 30 and 40. In this case, the dimensions of the tamper sensor would generally correspond to the size of the head of the bolt 20. Thus, any size bolt or connector may be protected by, and concealed by, a tamper sensor or similar size, and cannot be removed by any method without detection.

Figure 1:
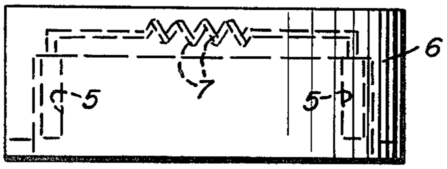
FIG. 1 is a side view of an alarm sensor cover having a resistance sensor shown in dotted lines.
Figure 2:
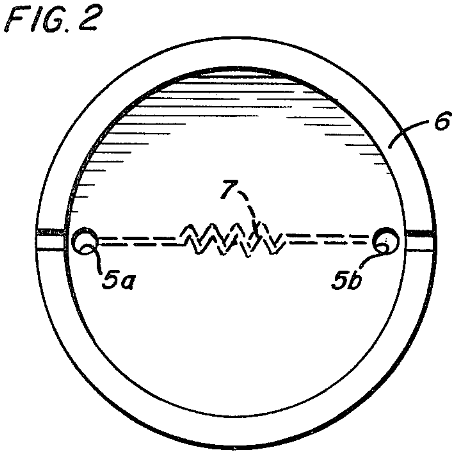
FIG. 2 is a top view of the tamper sensor cover of FIG. 1, wherein the resistance sensor is shown in dotted lines.

Turning now to FIGS. 1 and 2, the invention will now be described in greater detail.

The top cover 6 of the tamper sensor is shown in FIG. 1. In this embodiment, the plug connectors 5*a* and 5*b* are placed parallel to the vertical axis of the cover 6, near its outer perimeter. The plugs are 180° apart and extend to engage corresponding electrical sockets in the base. Each plug is electrically connected to one end of resistor 7. Resistor 7 is embedded across the radial center of the cover. As will be appreciated from FIG. 2, this arrangement does not require screws for connecting the cover 6 and base 1. Further, there are no visible connectors accessible from outside the cover for possible tampering. The use of simple electrical plugs inside the case for both electrical and mechanical connection makes the tamper sensor simple to install and use, and economical to produce.

Where it is desirable to have a cover which is even more sensitive to attempted tampering, the cover may be formed as shown in FIG. 13. In this figure, the cover 6 comprises embedded resistor 7 coupled to electrical plugs 5*a* and 5*b*. However, the resistor 7 is connected to plugs 5*a* and 5*b* via a spirally wound conductor 19 embedded in the plane of the cover 6. The electrical conductor 19 may be arranged in any desirable undulating configuration to protect a large surface area of the cover 6, including along the sides of the cover. If an attempt is made to saw through or otherwise violate the cover 6, the conductive wire 19 will be severed or shorted, actuating the alarm circuit.

Figure 3:
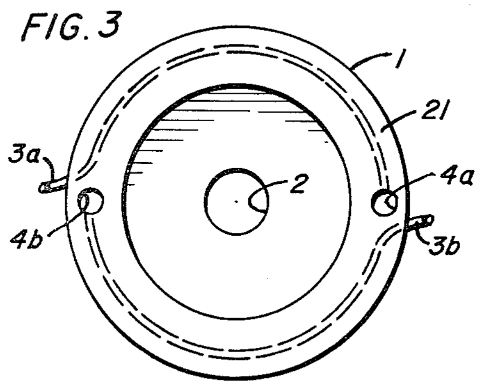
FIG. 3 is a top view of an alarm sensor base, having leads for connection to alarm reporting circuitry.
Figure 4:
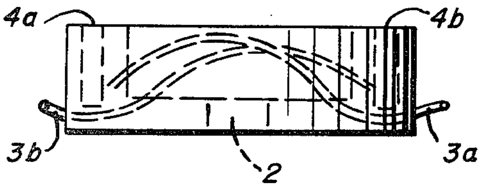
FIG. 4 is a side view of a tamper sensor base having undulating wire leads.

The base 1 of the tamper sensor also includes electrical conducting leads, as will be seen from FIG. 3 and FIG. 4. The base 1 is disc-shaped with a hole 2 in the center to accommodate a given size screw or bolt. Two separate electrical conductors 3*a* and 3*b* enter the base at approximately 180° separation, and each traverses one-half the circumference of the base in opposite directions.

The two conductors 3*a* and 3*b* are embedded in the annular section 21 of the base, just beneath the surface of the outer perimeter, in an undulating pattern from near one end to near the other end. Within the annular section 21, conductors 3*a* and 3*b* are connected to embedded electrical sockets 4*a* and 4*b*, respectively. The sockets 4*a* and 4*b* in the base are aligned with the plugs 5*a* and 5*b* in the cover, and form electrical and mechanical connections.

Having described the mechanical arrangement of the tamper sensor system, the electrical aspects will be discussed in greater detail, reference now being made to FIGS. 7-12, especially. FIGS. 7, 10, 11 and 12 show other kinds of sensors in combination with the tamper sensor, while FIGS. 8 and 9 more specifically are schematic representations of detector circuits for the tamper sensing systems.

In FIG. 7, a plurality of tamper sensors is shown, with two sensors in each of four loops. The first loop includes tamper sensor resistor 7 in series with undulating conductors 3*a* and 3*b*, in series with tamper sensor resistor 17 and undulating conductors 13*a* and 13*b*. The second loop includes tamper sensor resistors 27 and 37 in series with undulating wire conductors 23*a*, 23*b*, 33*a* and 33*b*. Tamper sensor resistors 47 and 57, and conductors 43*a*, 43*b*, 53*a* and 53*b* constitute the third loop. The fourth loop comprises tamper sensor resistors 67 and 77 and undulating conductors 63*a*, 63*b*, 73*a* and 73*b* in series connection.

Each of the four loops constitutes one arm of an alarm detection bridge circuit. The resistors in each sensor cover maintain a balanced condition in an alarm control circuit as shown in FIG. 8.

In the alarm control circuit of FIG. 8, capacitors 112, 113, 114 and 115 are coupled across the four loops. Radio frequency chokes 116 and 117 are each coupled to a pair of loops; and capacitor 101 is coupled between the two r.f. chokes. The capacitor and r.f. chokes are filtering components used in a conventional manner.

Two silicon controlled rectifiers 108 and 118 are reverse connected across resistor 109 in a bridge circuit. The sensor circuit comprises the four resistance arms of the bridge, and maintains balance. When in a balanced state, there is no current flow through resistor 109, and the circuit is at rest. If one of the tamper sensors is violated, or a loop is severed or shunted, current will flow through resistor 109. The direction of the current through resistor 109 will depend upon the nature of the violation. Because the triggering gate of each silicon controlled rectifier is at opposite ends of resistor 109, one of the SCR's will trigger regardless of current flow direction. As one of the silicon controlled rectifiers 108 and 118 triggers, it in turn triggers silicon controlled rectifier 110, which is directly coupled to SCR 108 and SCR 118. Resistor 123 is a stabilizing bleeder. When SCR 110 is activated, it latches load 111 in an energized state, causing an alarm to report.

The circuit is powered by power supply 105 via on/-off switch 104 in a usual manner. Power supply 105 can be a small battery.

FIG. 9 shows another embodiment of the alarm sensor circuit which is fully adjustable. In this configuration, only bridge arm I and bridge arm III are utilized for security loop imputs. Bridge arms II and IV are still connected internally with resistance to maintain bridge balance when there is no security loop violation.

The four-position switch 90 and 91 in bridge arms I and III respectively operate as follows: the "arm off" position is chosen when nothing is connected in the loop, and the arm is not in use. The "zero" position is used when only closed circuit sensors are in use in the given arm. The "one" position is used when only one bolt and screw tamper sensor is in use in the given arm. In the "one" position, resistor 92 in arm I and resistor 93 in arm III are bypassed. Finally, the "two" position is chosen when two bolt and screw tamper sensors are used in the given arm. In this position, both resistors 92 and 94 in arm I and resistors 93 and 95 in arm III are bypassed.

The alarm sensor circuit in FIG. 9 operates differently from that of FIG. 8. The separation of the anodes of the two silicon controlled rectifiers 208 and 218 connected in reverse across resistor 209 permits separate loads 211 and 221 to report alarm signals for the respective SCR's, and differentiates between a shunted and a severed loop. Silicon controlled rectifier 210 latches load 211, and SCR 220 latches load 221.

Open, closed, and photo-electric sensors of the conventional type may be used, in any combination, simultaneously on one or both of the security loop inputs (arms I and III).

FIG. 10 shows a security loop 164 using two bolt and screw tamper sensors 127 and 137 with photo-cells 125, 126, 128, 129 and 130 placed both in series and in parallel. Series photo-cells would have a lower resistance than ones placed in parallel.

FIG. 11 shows a security loop 165 having two bolt and screw tamper sensors 147 and 157, and normally closed sensors 140, 141, 142, 143, and 144 placed in series. Any number of normally closed sensors could be utilized.

FIG. 12 shows security loop 166 using two bolt and screw tamper sensors 167 and 177 with normally open sensors 150, 151, 152, and 153 placed in parallel. The normal sensors may parallel one sensor or the entire security loop 166. Again, any number of normally open sensors could be incorporated.

Conventional sensors may be utilized as described to increase security by protecting such things as doors and windows, using a single control unit. By virtue of its small size and low cost, the control unit could be mounted in a single housing shell to provide large-scale security coverage.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. A tamper sensor system for protecting a screw or bolt secured to an object, comprising a housing including a cover means and a base means for protectively covering said screw or bolt, said base means being arranged about said screw or bolt, said cover means removably attached to said base means, electrical circuit means arranged within said cover means and said base means, said electrical circuit means having a normal state of operation; said electrical circuit means being arranged within said housing such that it will be open circuited or short circuited upon violation of said housing, and alarm sensor circuit means coupled to said electrical circuit means for sensing a change from said normal state of operation to said open circuited or short circuited condition.

2. A tamper sensor system according to claim 1 wherein said base means has a hole therein for passage of said screw or bolt; said screw or bolt having a head portion for engaging said base means against said object.

3. A tamper sensor system according to claim 2, further comprising electrically conductive connector means, said electrically conductive connector means connecting said electrical circuit means between said cover means and said base means, whereby, when said cover means is removed from said base means said electrically conductive connector means is disconnected, and said electrical circuit means changes from said normal state of operation to said open circuited condition.

4. A tamper sensor system according to claim 1 or claim 3 wherein said housing is formed substantially of non-conductive material, and at least a part of said electrical circuit means is embedded in said non-conductive housing material.

5. A tamper sensor system according to claim 4 wherein said electrical circuit means comprise resistor means.

6. A tamper sensor system according to claim 5 wherein at least said resistor means are embedded in said non-conductive housing material.

7. A tamper sensor system according to claim 5 wherein said electrical circuit means further comprise undulating conductor means, and at least said undulating conductor means is embedded in said non-conductive housing material.

8. A tamper sensor system according to claim 7 wherein said undulating conductor means are embedded in said cover means.

9. A tamper sensor system according to claim 7 wherein said undulating conductor means are embedded in said base means.

10. A tamper sensor system according to claim 7 wherein said alarm sensor circuit means further comprises a balanced bridge detector circuit, said bridge detector circuit being in a balanced condition when said electrical circuit means has said normal state of operation.

11. A tamper sensor system according to claim 10 further including switching means coupled to said electrical circuit means for selectively activating said electrical circuit means.

12. A plurality of tamper sensor systems according to claim 7, said alarm sensor circuit means comprising a balanced bridge detector circuit, said bridge detector circuit being in a balanced condition when the electrical circuit means of each tamper sensor system has said normal state of operation.

13. A plurality of tamper sensor systems according to claim 12, wherein at least one of the tamper sensor systems includes switching means coupled to the respective electrical circuit means for selective actuation thereof.

14. A plurality of tamper sensor systems according to claim 13 wherein said alarm sensor circuit means further comprises a plurality of loads coupled to said balanced bridge detector circuit; and means for selectively latching said plurality of loads, responsive to a change in state of operation of said electrical circuit means.

15. A plurality of tamper sensor systems according to claim 14 wherein said balanced bridge detector circuit comprises at least first and second silicon controlled rectifiers coupled between said switching means and said plurality of loads.

* * * * *